April 18, 1967 A. H. WILLINGER 3,314,396
ALGAE PROPAGATING AND FISH FEEDING SYSTEM
Filed June 17, 1965

INVENTOR.
ALLAN H. WILLINGER
BY
Friedman & Goodman
ATTORNEYS

United States Patent Office 3,314,396
Patented Apr. 18, 1967

3,314,396
ALGAE PROPAGATING AND FISH
FEEDING SYSTEM
Allan H. Willinger, New Rochelle, N.Y., assignor to Aquariums Incorporated, Maywood, N.J., a corporation of Delaware
Filed June 17, 1965, Ser. No. 464,749
14 Claims. (Cl. 119—5)

The present invention relates to a novel algae propagating matrix and fish feeding device for use in aquariums.

The proper feeding of aquarium fish has always presented a problem. In the natural environment, nature has provided vegetation in a form which is readily assimilated by the types of fish that require such a diet. The natural food on which these fish subsist is called algae. Algae are present in all water supplies. They multiply profusely under the proper conditions. In an aquarium, both heat and light stimulate the growth of algae. However, since the popular advent of plastic polyethylene aquarium plants, there is no longer a need to expose the aquarium to extensive amounts of light as had been the case where natural aquarium plants had been used. Because of the reduction in the use of light in aquariums, the growth of algae has been retarded and reduced, much to the detriment of the most popular types of fish kept in aquariums. Furthermore, those types of algae which manage to survive under reduced light conditions adhere quite tenaciously to the glass surfaces of the aquarium tank, thus making it almost impossible for the fish to remove such algae.

In view of the foregoing, it is an object of the present invention to obviate prior art problems related to the feeding of fish.

It is another object of the present invention to provide a means for feeding of broad range of fish types which require a large amount of vegetation in their diet in order to survive.

It is another object of the present invention to provide a means for propagating algae and for supporting their growth so as to provide the necessary diet for various types of fish.

It is a further object of the present invention to provide a cover for a thermostatically controlled aquarium heater, which cover will stimulate propagation of algae in an aquarium.

Other and further objects and advantages of the present invention will be readily apparent to one skilled in the art from a consideration of the following specification taken in connection with the appended drawing.

In the drawing, which best illustrates the best mode presently contemplated for carrying out the invention:

Briefly described, the present invention contemplates the utilization of a foraminous or mesh body which may be in the form of a hollow foraminous tube as an algae propagating matrix and as a fish feeding device. Such a tube has interstices which preferably are at least $\frac{1}{16}$ inch to $\frac{1}{4}$ inch apart so that algae growths develop upon the mesh surfaces and within such interstices would begin to bridge the spaces thereof. The algae growths upon the surfaces and within such interstices would be readily accessible to the fish within the aquarium tank. Such a matrix tube can be disposed within an aquarium tank and utilized as an independent fish feeding device. In addition, it is within the contemplation of the present invention to utilize such a tube as a matrix on a thermostatically controlled aquarium heater so that the heater will stimulate to a greater extent the growth of the algae on the cover or matrix. Since all of the thermostatic heaters presently used in aquariums have an inside pilot light, such additional light, in close contact with the foraminous matrix additionally stimulates the algae growths on the covering tube. In such cases, the convection currents generated by the heating elements of the thermostatically controlled aquarium heater keeps the algae in a fluffy state and provides it with an undulating motion in the aquarium water so as to make it even more accessible to the fish in the aquarium. Moreover, the algae propagating matrix is preferably fabricated from a relatively smooth plastic. This serves to increase the propagations of the algae by inducing the normally tenacious adhesion of the algae thereto. In addition, the smooth plastic facilitates the removal of the algae by the fish feeding thereon.

All of the viviparous fish are algae eaters. Black mollies (Mollienisia), the Guppy (*Lebistes reticulatus*), platy Fish (*Xiphophorus maculatus*), and Swordtails (*Xiphophorus hellerii*) are species of viviparous fish. Some fish have every specialized lip configurations which allow them to remove algae more readily from a supporting structure. Species of such fish are the Kissing Gourami (*Helostoma temmincki*), the sucker Catfish (*Plecostomus plecostomus*) and *Otocinclus affinis*.

Figure 1:
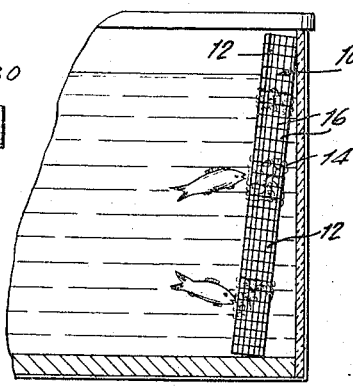
FIGURE 1 is a view of an aquarium provided with a fish feeding device pursuant to the present invention.

Referring now to FIGURE 1 of the drawings in detail, there is shown an algae propagating matrix and fish feeding device 10 pursuant to the present invention. As here shown, the device 10 is in the form of a hollow foraminous tube which is preferably an extrusion formed of a semi-rigid smooth plastic material, for example and not by way of limitation, polyethylene or polypropylene. The tube 10 is provided with a plurality of foramens or interstices 12 each of which is preferably $\frac{1}{16}$ of an inch wide. I have found that interstices which range in width from $\frac{1}{16}$ to $\frac{1}{4}$ inch provide best results. The mesh-like or foraminous structure of tube 10 provides a perfect base for propagating profuse algae growths 14. Such growths cling to and spread along the smooth solid portions 16 of the tube and also fill the interstices 12 which are dimensioned to be readily spanned by the algae.

Fish can readily feed off the algae growing along the solid portions 16 and even more readily feed off the algae which span the interstices 12. The surfaces of the matrix 10 permit the fish to get close thereto and feed on the algae propagating thereon without injury to the fish.

Figure 2:
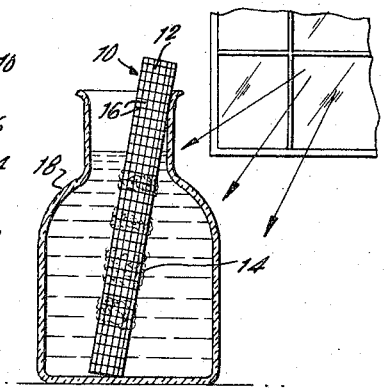
FIGURE 2 is a view illustrating a method for stimulating an original algae growth on the fish feeding device.
Figure 4:
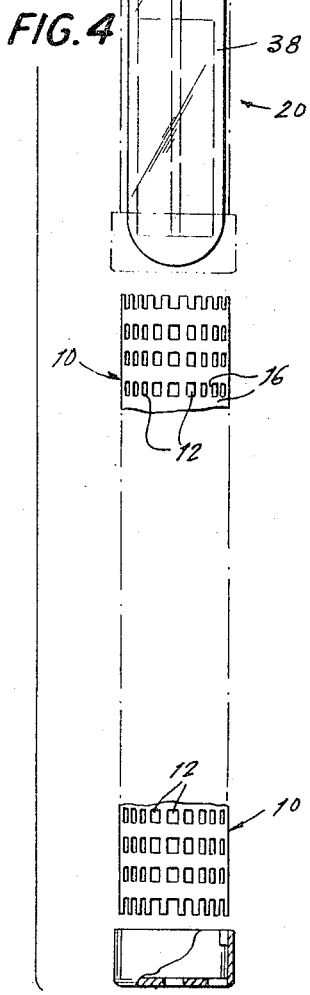
FIGURE 4 is an exploded view of the device shown in FIGURE 3.

FIGURE 1 shows the algae propagating matrix and fish feeding device 10 disposed as a self-supported unit within the aquarium. While, as previously indicated, it is in the form of a hollow tube, it will be understood that it is within the concept of the present invention to utilize a foraminous sheet in lieu of a foraminous tube. It is also within the scope of the present invention to utilize materials other than semi-rigid plastics, for example and not by way of limitation, the foraminous tube or sheet could be formed of other suitable materials, such as stainless steel mesh or glass mesh.

Where it is desired to obtain a fast initial growth of algae on the device 10, the latter may initially be placed in a suitable container or bottle 18 (FIGURE 2) which is filled with water. The bottle should preferably be placed in a bright sunny window location so that the combined effect of sun light and sun heat will stimulate the growth of the algae. Thereafter, the device 10 can be removed from the bottle and transferred to an aquarium with the profuse algae blooms attached thereto.

Figure 3:
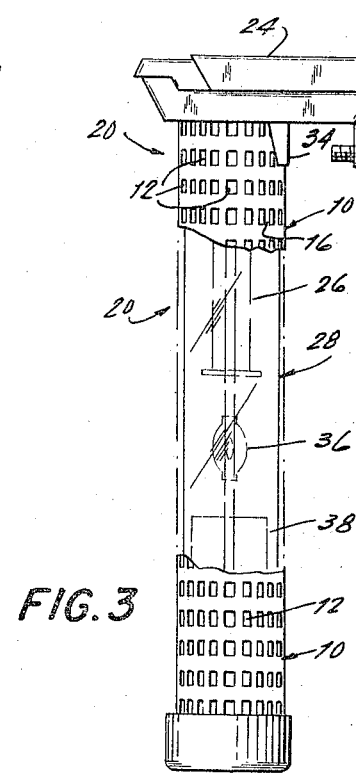
FIGURE 3 illustrates the fish feeding device combined with an aquarium heater.

If desired, the foraminous matrix 10 may be utilized also in combination with a conventional thermostatically controlled aquarium heater 20 (FIGURE 3). Whereas the plastic matrix 10 is self-supporting when used by itself in an aquarium, as shown in FIGURE 1, it lends itself readily to encapsulating the housing 28 since it has elastic qualities and is capable of being produced very economically. The conventional aquarium heater comprises a casing 24 from which there depends an electric heater mechanism 26. The electric heater mechanism 26 extends into a glass housing, or envelope 28, which is supported by and depends from the casing 24. The casing 24 is provided with a means for clamping the casing onto the peripheral edge of a wall of the aquarium, so that the housing 28 can extend into the aquarium. Said clamping means is constituted by a screw 30 which is threaded into an integral lug 32 provided on the housing 24. A pair of clamping abutments 34 depend from the casing 24 in opposition to the lug 32 so that the aquarium wall can be engaged between the screw and the clamping abutments 34. The previously described elements or components of the aquarium heater assembly 20 are of known construction.

The electric heater mechanism 26 includes a pilot light 36 and a white ceramic heating element reflector 38 which reflects and concentrates light. Consequently, when transparent housing envelope 28 is covered by the foraminous matrix 10, light from pilot light 36 is concentrated thereon. Any external light is also reflected from the white ceramic heating element. This serves to further promote the growth of algae on the algae propagating device 10. Also, the gentle warmth of the heater in close promixity to the matrix stimulates algae growth.

Figure 5:
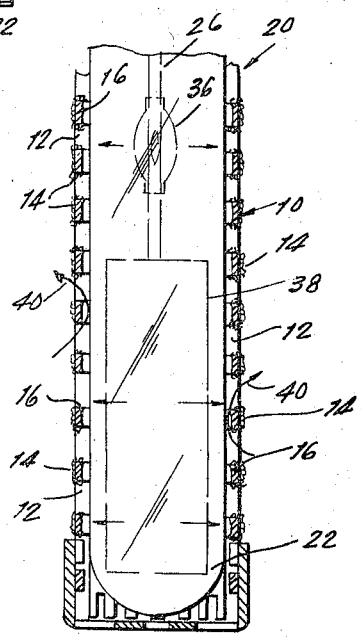
FIGURE 5 is a fragmentary sectional view of a portion of FIGURE 3.

It will be noted from FIGURE 5 that there is a space between the inner surface of the tubular feeding matrix 10 and the heater envelope so as to provide for water circulation, as indicated by arrows 40. This facilitates the undulatory movement of the algae which fill the interstices.

It will be understood that various changes and modifications may be made within the structure of the present invention without, however, departing from the basic inventive concept thereof, as set forth in the appended claims.

The embodiments of the invention in which an exclusive property or privilege is claimed, is defined as follows.

I claim:

1. A fish feeding device comprising a housing, electric heater means mounted within said housing, and a smooth surfaced foraminous matrix enclosing said housing and adapted to propagate the growth of aquarium vegetation.

2. A fish feeding device comprising a housing, electric heater means mounted within said housing, and a smooth surfaced foraminous matrix enclosing said housing and adapted to propagate the growth of aquarium vegetation, said foraminous matrix having interstices defined therein, said interstices having a widthwise dimension substantially in the range from $\frac{1}{16}$ inch to $\frac{1}{4}$ inch.

3. A fish feeding device comprising a housing, electric heater means mounted within said housing, and a smooth surfaced foraminous matrix enclosing said housing and adapted to propagate the growth of aquarium vegetation, said foraminous matrix being formed of semi-rigid plastic material.

4. A fish feeding device comprising a transparent tube, electric heater means mounted within said tube, and a smooth surfaced foraminous matrix enclosing said tube and adapted to propagate the growth of aquarium vegetation, said electric heater means having a pilot light and a reflector whereby light from said pilot light is reflected by said reflector through said tube onto said foraminous matrix.

5. An algae propagating matrix and fish feeding device for immersion in an aquarium comprising a hollow member formed of relatively smooth material and provided with a plurality of interstices which are adapted to be spanned by algae, said interstices having walls spaced apart a distance substantially in the range from $\frac{1}{16}$ inch to $\frac{1}{4}$ inch and a source of light and heat disposed therein.

6. An algae propagating matrix and fish feeding device as in claim 5, wherein said member is a hollow tubular member.

7. An algae propagating matrix and fish feeding device as in claim 5, wherein said member is a hollow tubular member formed of semi-rigid plastic material.

8. A fish feeding device comprising a translucent tube, electric heater means mounted within said tube, and a foraminous matrix enclosing said tube and adapted to propagate the growth of aquarium vegetation, said electric heater means having a pilot light and a reflector whereby light from said pilot light is reflected by said reflector through said tube onto said foraminous matrix.

9. An algae propagating matrix and fish feeding device for immersion in an aquarium comprising a hollow member formed of relatively smooth material and provided with a plurality of interstices which are adapted to be spanned by algae, said interstices having walls spaced apart a distance substantially in the range from $\frac{1}{16}$ to $\frac{1}{4}$ inch and being adapted to be subjected to the action of light.

10. A device according to claim 9, wherein said hollow member is formed of a semi-rigid plastic material.

11. A device according to claim 9, wherein said hollow member is tubular.

12. A method of propagating algae in a fish habitat comprising the steps of forming a perforated hollow member with closely spaced openings of a size on the order of $\frac{1}{16}$ to $\frac{1}{4}$ of an inch measured transversely of the openings, immersing the member in a fish habitat, subjecting said hollow member to a source of light and leaving said member immersed for a period of time so that algae producing media occurring naturally in the habitat will grow on the surface of the member.

13. The method according to claim 12, wherein the perforated hollow member is formed of a semi-rigid plastic material.

14. The method according to claim 12, wherein said hollow member is subjected to the action of heat.

References Cited by the Examiner

UNITED STATES PATENTS

| | | | |
|---|---|---|---|
| 2,990,808 | 7/1961 | Rumonski | 119—1 |
| 3,119,774 | 1/1964 | Arak | 210—169 |
| 3,139,402 | 6/1964 | Armburst | 119—5 X |
| 3,235,877 | 2/1966 | Grob | 119—5 X |

SAMUEL KOREN, *Primary Examiner.*

ALDRICH F. MEDBERY, *Examiner.*